US009022691B2

(12) United States Patent
Westergaard

(10) Patent No.: US 9,022,691 B2
(45) Date of Patent: May 5, 2015

(54) METHOD OF INSTALLING AN OFFSHORE WIND TURBINE AND A TRANSPORT VESSEL THEREOF

(71) Applicant: Envision Energy (Denmark) ApS, Silkeborg (DK)

(72) Inventor: Jan Westergaard, Brande (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 0 days.

(21) Appl. No.: 14/012,217

(22) Filed: Aug. 28, 2013

(65) Prior Publication Data

US 2014/0064856 A1    Mar. 6, 2014

(30) Foreign Application Priority Data

Aug. 30, 2012  (DK) .................................. 2012 70516

(51) Int. Cl.
   *B63B 35/00*   (2006.01)
   *E02B 17/08*   (2006.01)
   *F03D 1/00*    (2006.01)

(52) U.S. Cl.
   CPC ............... *E02B 17/08* (2013.01); *F03D 1/001* (2013.01); *F03D 1/005* (2013.01); *F05B 2240/95* (2013.01); *F05B 2260/02* (2013.01); *B63B 35/003* (2013.01); *Y02E 10/727* (2013.01)

(58) Field of Classification Search
   CPC ....... B63B 35/003; E02B 17/08; F03D 1/005; F05B 2240/95; Y02E 10/727
   USPC .................. 405/196, 199, 203, 204, 209, 224
   See application file for complete search history.

(56) References Cited

U.S. PATENT DOCUMENTS

| 8,251,004 | B2 * | 8/2012 | Olsen et al. ..................... 114/258 |
| 8,313,266 | B2 * | 11/2012 | Numajiri ......................... 405/204 |
| 8,708,605 | B2 * | 4/2014 | Cholley et al. ................. 405/209 |
| 2005/0286979 | A1 * | 12/2005 | Watchorn ........................ 405/224 |
| 2007/0243063 | A1 * | 10/2007 | Schellstede ....................... 416/10 |
| 2009/0191002 | A1 * | 7/2009 | Stubler et al. .................. 405/209 |
| 2010/0281820 | A1 * | 11/2010 | Soe-Jensen ................. 52/745.18 |
| 2010/0316450 | A1 * | 12/2010 | Botwright ...................... 405/206 |
| 2011/0058925 | A1 * | 3/2011 | Springett et al. .............. 414/785 |
| 2011/0126748 | A1 * | 6/2011 | Wu et al. ........................ 114/121 |
| 2011/0129303 | A1 * | 6/2011 | Wu et al. ........................ 405/219 |

(Continued)

FOREIGN PATENT DOCUMENTS

NL       1023142 C1   10/2004
WO    2010/059489 A1    5/2010

(Continued)

*Primary Examiner* — Benjamin Fiorello
(74) *Attorney, Agent, or Firm* — Roberts Mlotkowski Safran & Cole, P.C.; David S. Safran

(57) ABSTRACT

A method of installing an offshore wind turbine and a transport vessel for use therewith in which a part of a wind turbine is secured to the transport vessel by raising the part in a perpendicular direction relative to the transport vessel into a transport position using a lifting device arranged on the transport vessel at a loading site. The transport vessel is then moved from the loading site out to an installation site. The transport vessel is secured to an offshore foundation which is located at the installation site by a holding device. The wind turbine is then lowered onto an upper part of the offshore foundation using the lifting device. Finally, the transport vessel is released and moved away. The lifting device is at least one set of jack-up device.

8 Claims, 8 Drawing Sheets

(56) References Cited

U.S. PATENT DOCUMENTS

| | | | |
|---|---|---|---|
| 2011/0129329 A1* | 6/2011 | Wu et al. | 415/7 |
| 2011/0129334 A1* | 6/2011 | Wu et al. | 415/126 |
| 2011/0139056 A1* | 6/2011 | Cholley et al. | 114/264 |
| 2011/0314750 A1* | 12/2011 | Nies | 52/173.1 |
| 2012/0183359 A1* | 7/2012 | Nordstrom et al. | 405/205 |
| 2012/0279434 A1* | 11/2012 | Lebon et al. | 114/264 |

FOREIGN PATENT DOCUMENTS

| | | |
|---|---|---|
| WO | 2011028102 A2 | 3/2011 |
| WO | 2011/108938 A1 | 9/2011 |
| WO | 2011103988 A1 | 9/2011 |
| WO | 2012/066789 A1 | 5/2012 |

\* cited by examiner

METHOD OF INSTALLING AN OFFSHORE WIND TURBINE AND A TRANSPORT VESSEL THEREOF

BACKGROUND OF THE INVENTION

1. Field of the Invention

The present invention relates to a method of installing an offshore wind turbine comprising the steps of securing at least a part of a wind turbine to a transport vessel by bringing lifting means located on the transport vessel into contact with the part and raising the part in a parallel direction relative to the longitudinal direction of the wind turbine using the lifting means;

moving the transport vessel from a loading site out to an installation site;

securing the transport vessel to at least a part of an offshore foundation which is located at the installation site, wherein the offshore foundation is configured to receive and hold the wind turbine; and lowering the wind turbine onto an upper part of the offshore foundation using the lifting means.

The present invention also relates to a vessel for transporting and installing an offshore wind turbine, where the vessel comprises a hull having a deck and at least one side surface;

a slot arranged in one of the side surfaces wherein at least one wind turbine may be positioned;

one or more holding means for securing the vessel to an offshore foundation located at an installation site.

2. Description of Related Art

When installing offshore wind turbines, there exists a need for transporting the wind turbine out to the installation site as well as ways to assemble the wind turbine either at the site or before transportation. First, a foundation has to be secured to the seabed at the installation site, and then, a transition piece or intermediate piece of the wind turbine is mounted to the foundation, before the remaining parts of the wind turbine can be installed. Depending on the design of the foundation, the transition/intermediate piece may form the upper part of the foundation.

Today, the different pieces of the wind turbine or the partly preassembled wind turbine are loaded onto an installation vessel which is then moved to the installation site. The installation vessel is then jacked up, lowered onto the seabed or maintained in its position using a mooring system. The wind turbine is then assembled using a crane on the installation vessel. Another way of installing an offshore wind turbine is to preassemble the entire wind turbine onshore, and then load it onto a barge and move the barge out to the installation site. A ship having a crane is then used to install the wind turbine at the installation site. All these installation methods require the use of an offshore crane which in turns increases the installation costs and the total installation time, since it is expensive to use such a crane and it takes time to erect the crane if it is compacted during transport. The use of an offshore crane furthermore requires relative came wind condition so that the individual pieces can be lifted and installed safely, since the tall crane is sensitive to wind impacts.

U.S. Patent Application Publication 2010/0316450 A1 discloses an installing method where a number of wind turbines are preassembled at the harbour and then loaded onto a barge in a vertical position. The barge is then towed out to the installation site by a towing vessel. The barge is then positioned relative to the installation site using a fendering and mooring spread system. A wind turbine is then skidded to an installation position on the barge and optionally adjusted in the vertical position by means of a jacking system relative to the foundation extending above the water surface. The barge is then lowered so that the lower section of the wind turbine is positioned on the upper part of the foundation by using ballasting tanks or tensioning means connected to anchors located on the seabed after which the barge is towed away from the foundation and then re-raised using the ballasting tanks or tensioning means. This method requires the use of a mooring system comprising at least three mooring points to keep the barge in position during the installation process. The wind turbine is installed by lowering and re-raising the entire barge which in turns increases the total installation time, since this is a time consuming process. The geometric metacentric height of the barge is furthermore raised, since the wind turbines are positioned on the desk, thus making the barge more sensitive to waves and wind impacts. Furthermore, a mating system is needed between the foundation and the wind turbine to absorb the impact loads during the load transfer, since the barge can be moved relative to the foundation due to the waves and wind impacts.

International Patent Application Publication WO 2012/066789 A discloses a similar method where the wind turbines are loaded onto one end of the desk of an installation ship using an onshore crane. The wind turbine is then moved along the desk to other end using clamping means located at the top of two parallel support structures located on the desk. The ship is then jacking up on the seabed before the wind turbine is moved into position over the foundation. The ship is then lowered so that the wind turbine is positioned on the foundation. The loading of the wind turbines takes time, as well as the jacking up and down of the ship which all add to the total installation time. The transport requires low speeds since the wind turbines are positioned on the desk, thus making them more sensitive to the wind and waves.

International Patent Application Publication WO 2011/103988 A1 discloses an installing method where the entire structure, including the offshore wind turbine and the foundation, are preassembled at a small platform near the harbour. A transport vessel is then moved into position over the foundation and secured to the foundation by means of rollers and pulleys. The entire structure is then lifted and sailed out to the installation site. Support poles are then extended out of the hull of the vessel, and the foundation is then filled with ballast via a second ship. The transport vessel is then lowed via ballast tanks until the support poles contact the seabed. The foundation, including the wind turbine, is then lowed into position, and the rollers and pulleys are then disconnected and raised back up. The transport vessel is then re-raised using the ballast tanks, and then sailed away. This method requires the wind turbine and the foundation to be preassembled at the harbour. This method only works well if the foundation is a gravity foundation, since the foundation is used to provide stability using transport and installation. The transport vessel needs to be placed on the seabed before the wind turbine can be installed, which in turns adds to the total installation time. Furthermore, the foundation needs to be filled with ballast before being lowered into position, which requires the use of a second ship.

International Patent Application Publication WO 2011/108938 A2 discloses an installing method where the offshore wind turbine and the transition piece are preassembled at the harbour and then skidded onto a pivotal support structure on the barge in a horizontal position. The wind turbine is then secured to the support structure using an actuation device extending towards the slot. The barge is then towed out to the installation site. The support structure is then pivoted around a pivot point into a slot formed in the barge so that the wind turbine and the foundation are positioned in a substantially vertical position. The transition piece and the wind turbine are then positioned over the foundation using a dynamic positioning system, and then lowered onto the upper part of the foundation using the actuation device. The actuation device is then released and the barge is then towed away. This method requires the wind turbine to be rotated into the vertical position before installing the wind turbine, thus in turns adding to the total installation time. This support structure requires the use of winches located on the front of the barge to pull the wind turbine and the transition piece away from the support structure so that the transition piece does not comes into contact with the support structure while being lowered into position.

International Patent Application Publication WO 2010/059489 A1 discloses an installation method where the wind turbine is pre-assembled before being transported out to the installation site using a catamaran. The catamaran comprising an upwards extending support structure and a slot in which the wind turbine is positioned. The catamaran is lowered by filling the ballast tanks with water and moved into position relative to the wind turbine. The wind turbine is then secured to the support structure using clamps arranged on the support structure. The catamaran is then raised by emptying the ballast tanks and moved out to the installation site. The wind turbine is positioned on the foundation by lowering the catamaran again. The raising and lowering of the catamaran is a slow process which adds to the total installation time. The transport can only be done at low wind speed where the wind turbine can be held in a stable position, as the wind turbine is transported in an elevated position above the water surface.

SUMMARY OF THE INVENTION

An object of the invention is to provide means for installing an offshore wind turbine which can be preformed by the use of a single vessel.

An object of this invention is to provide an installation method which reduces the total installation time and installation costs.

An object of this invention is to provide means for securing the transport vessel to the foundation.

An object of the invention is to provide means for performing a stable transportation of an upright wind turbine structure.

An object of the invention is achieved by a method of installing an offshore wind turbine characterised in that the wind turbine is secured to the vessel at the loading site by jacking up the wind turbine relative to the vessel by means of at least one set of jack-up means, and lowered into position at the offshore foundation by jacking down the wind turbine relative to the vessel using the jack-up means.

This method eliminates the need for offshore cranes or specially designed installation vessels using a crane to install an offshore wind turbine, thereby reducing the total installation costs. This method allows the transport vessel to be secured to the foundation of the wind turbine, thus allowing the impacts from waves and winds to be transferred to the foundation so that the movement of the transport vessel relative to the foundation during installation is reduced to a minimum. This method allows the entire wind turbine or at least a part of it to be preassembled at the loading site, which in turn may reduce the total installation time and the total installation costs.

This allows the wind turbine to be lowered into position on the offshore foundation without the use of a crane or another hoisting system which has to be positioned above the wind turbine. Furthermore, this eliminates the need for loading the wind turbine onto the deck or into the cargo space of the transport vessel, since the transport vessel is capable of moving into position relative to the wind turbine and then raising it by means of a jacking system. The jack-up means may be a number of telescopic cylinders driven by hydraulics, air pressure or other suitable driving means. The jack-up means may be a scissor-lift arrangement or a conveyor belt/chain arrangement configured to contact the side surface of the wind turbine. The jack-up means may be arranged along a slot in the transport vessel in which one or more wind turbines may be positioned. This allows the transport vessel to carry more than one wind turbine per trip which saves time when installing multiple wind turbines.

According to one embodiment of the invention, the method further comprises the step of positioning at least a part of the wind turbine on a second foundation, which is located near a harbour edge, before raising the wind turbine and transporting it out to the installation site.

This allows the wind turbine to be preassembled using an onshore crane, such as a mobile crane or a harbour crane, which is cheaper to use then an offshore crane and enables more than one crane to be used when assembling the wind turbine. The first foundation may be placed under water near a harbour edge or wharf so that the transition piece of the wind turbine is partly submerged under water. The first foundation may be placed in a dry dock instead which is then flooded after the transition piece has been placed on the foundation. This allows the transition piece to be connected to the other parts of the wind turbine before being transported out the installation site. This simplifies the installation procedure, since the transition piece is normally installed at the installation site before the other parts of the wind turbine are installed. This method enables the installation (connection) between the foundation and the wind turbine to be carried out below the water surface. Depending on the configuration of the foundation and the wind turbine, the connection/installation may be carried out above the water surface. This method also allows only the transition piece and/or the foundation to be transported and installed, after which the other parts of the wind turbine may be installed.

According to one embodiment of the invention, the wind turbine is positioned in a transport position in which a lower portion of the wind turbine is located below the water surface.

This provides stability during transport of the wind turbine, since the lower portion of the wind turbine, which is under the water surface, is used to counteract the impacts from waves and winds during transport. This furthermore lowers the geometric metacentric height of the transport vessel, thereby making the transport vessel less sensitive to waves and winds.

According to a specific embodiment of the invention, the transport vessel is secured to the offshore foundation by moving at least one holding means out of a hull of the transport vessel and into contact with the offshore foundation.

This enables the transport to be secured directly to the foundation so that impacts from waves and winds are transferred from the transport vessel to the foundation via the holding means, thereby reducing the effects of the impacts of the transport vessel. By securing the transport vessel directly to the foundation, the transport vessel moves together with the foundation, thereby providing a more stable platform during the installation process. When the wind turbine is installed (connected), the holding means are then retracted into their initial position, and the transport vessel is then moved away. This embodiment is particularly suited for mono-pile foundations and gravity foundations, where the holding means are capable of being connected to the upwards extending part of the foundation. By altering the design of the holding means, this embodiment may also be used with other foundation designs.

According to a specific embodiment of the invention, the transport vessel is positioned in one or more positions relative to the second foundation along the slot by moving the holding means in a plane parallel to a deck of the transport vessel.

This enables the transport vessel to be aligned above the foundation so that the wind turbine can be lowered into the correct position without having to reposition the wind turbine on the transport vessel first. This also enables the transport vessel to carry more than one wind turbine, each of which may be positioned in an elongated slot in the transport vessel and may be secured by individual sets of jack-up means. The holding means may be configured as one or more telescopic arms or one or more arms having two or more joints driven by hydraulics, air pressure or other suitable driving means. The arms may at the free end comprise holding elements configured to either engage corresponding elements on the foundation or to press firmly against the surface of foundation. The arms may be arranged on or in the hull of the transport vessel and may be concealed in recesses formed in the hull when they are not used.

According to one embodiment of the invention, two or more parts of the wind turbine are preassembled at the loading site, before the wind turbine is raised and transported out to the installation site.

This method allows the tower sections and the nacelle to be preassembled at the loading site on the second foundation. The wind turbine rotor hub and the wind turbine blades may further be attached to the nacelle, before the entire structure is transported out to the installation site. This may reduce both the total installation costs and the installation time, since the majority of the assembling process is done onshore.

An object of the invention is also achieved by a vessel for transporting and installing an offshore wind turbine, characterised in that
  a number of cavities are arranged in the deck wherein one or more cavities are configured to receive and hold at least one set of jack-up means comprising a number of free ends configured to engage the wind turbine, wherein the jack-up means are configured to raise and lower at least a part of a wind turbine relative to the vessel in a direction parallel to the longitudinal direction of the wind turbine.

This provides a multipurpose transport vessel which can be outfitted with lifting means for transporting and installing one or more wind turbines. The lifting means can be mounted in one or more cavities on the deck along the slot, while other cavities can be used to store various equipment needed to install the wind turbine. This allows the transport vessel to be adapted to the number of wind turbines that need to be transported. The cavities enable the transport vessel to be outfitted with various types of lifting means depending on the specific configuration of the wind turbine.

This enables the transport vessel to lift the wind turbine without the use of a crane, thereby lowering the geometric metacentric height of the vessel. This allows the wind turbine to be placed in an upright extending position in the slot, thereby allowing a lower portion of the wind turbine to be submerged under water during transport, which in turns adds to the stability of the vessel during transport.

According to one embodiment of the invention, one or more cavities are configured to receive and hold a crane unit, wherein the crane unit is configured to engage one or more parts of the wind turbine or one or more elements arranged in or on one of the parts of the wind turbine.

This enables the transport vessel to be outfitted with a small crane unit when servicing the wind turbine. The crane unit may be used to replace various parts in or on the wind turbine. The other cavities may then be used to store spare parts and other equipment needed, thereby removing some of these parts from the deck which in turns allows the workers to move safely around on the deck.

According to a specific embodiment of the invention, the holding means are arranged in the hull, wherein the holding means are configured to be moved out of the hull and into contact with the offshore foundation below the water surface.

This enables the transport vessel to be secured directly to the foundation so that impacts from the waves and winds are transferred to the foundation. This allows the transport vessel to follow the movement of the upper part of the foundation, thereby providing a more stable platform during the installation process. After installation (connection), the holding means are then retracted into their initial position, and the transport vessel may then move away from the foundation either by use of its own driving means or by use of a towing vessel.

According to a specific embodiment of the invention, the holding means are configured to position the vessel in one or more positions relative to the offshore foundation along the slot.

This enables the transport vessel to carry more than one wind turbine and enables the transport vessel to be positioned correctly relative to the offshore foundation without having to reposition the wind turbine on the transport vessel first. The holding means may be configured as one or more telescopic arms or one or more arms having two or more joints driven by hydraulics, air pressure or other suitable driving means. The arms may at the free end comprise holding elements configured to either engage corresponding elements on the foundation or to press firmly against the surface of foundation. This allows the transport vessel to be moved in a plane parallel to the desk in at least two perpendicular directions.

The invention is described by example only and with reference to the drawings.

DETAILED DESCRIPTION OF THE INVENTION

In the following text, the figures will be described one by one and the different parts and positions seen in the figures will be numbered with the same numbers in the different figures. Not all parts and positions indicated in a specific figure will necessarily be discussed together with that figure.

Figure 1:
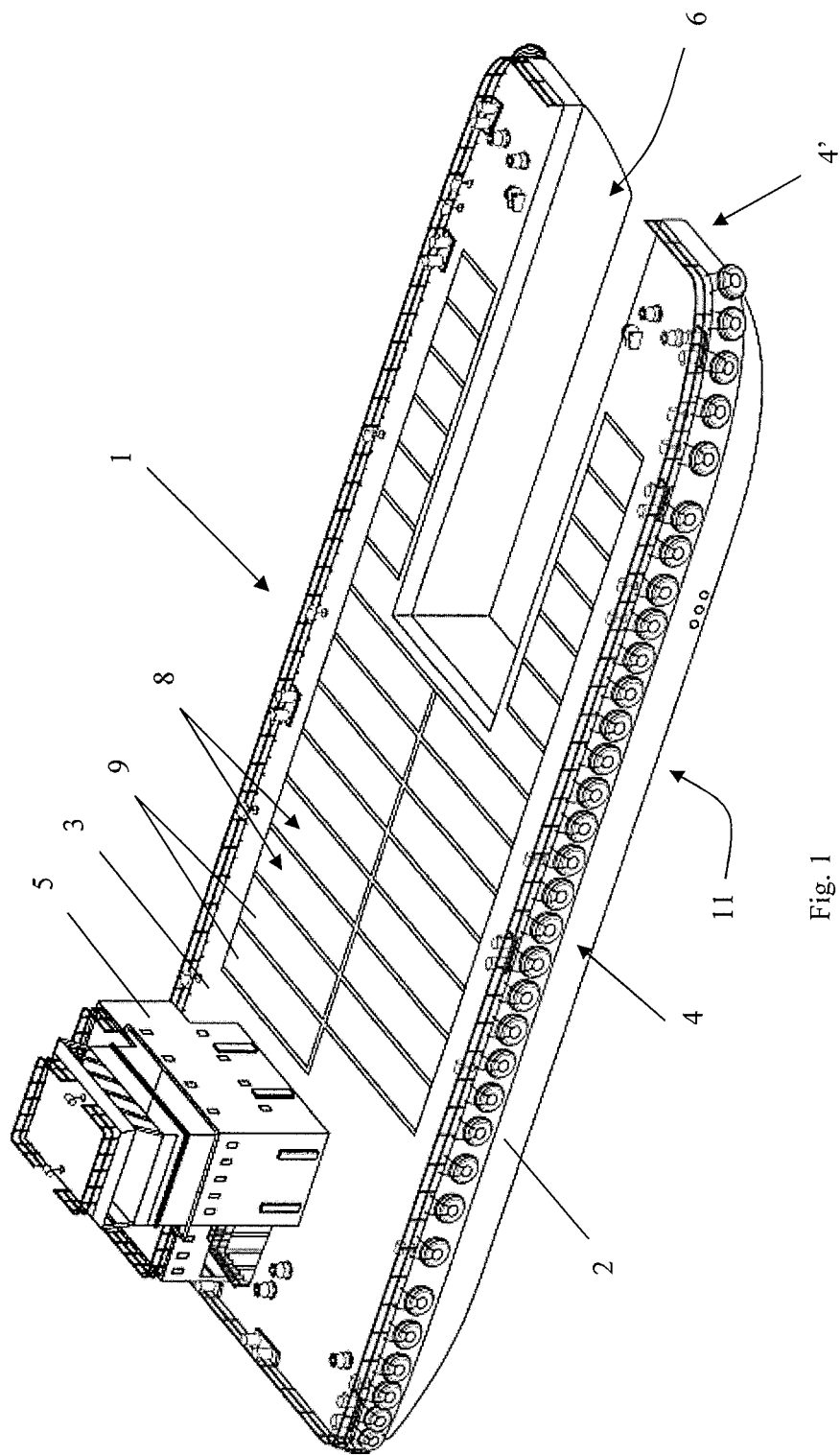
FIG. 1 shows an exemplary embodiment of the transport vessel.

FIG. 1 shows an exemplary embodiment of a transport vessel 1 according to the invention. The transport vessel 1 may comprise a hull 2 having a deck 3 and at least one side surface 4, 4'. The transport vessel 1 may be configured as a self-propelling vessel having a motor unit (not shown) which is configured to propel the vessel 1 to and from an installation site. A platform 5 in the form of a bridge may be arranged on the deck 3 and may be configured so that the transport vessel 1 may be controlled from the platform 5. The motor unit may be omitted, and the transport vessel 1 may be towed to and from the installation site instead.

At least one slot 6 may be arranged in one of the side surfaces 4' of the hull 2, wherein at least one wind turbine 7 may be positioned. The slot 6 may be arranged in the front of the hull 2, so that the transport vessel 1 may move into position relative to the wind turbine 7 from the front. The slot 6 may be shaped as an elongated slot wherein one or more wind turbines 7 may be arranged in one or more positions.

The vessel 1 may be configured as a multipurpose vessel comprising a number of cavities 8 which may be arranged in the deck 3. The cavities 8 may be formed in the hull 2 so that they do not extend outwards from the deck 3 and thereby limit the free space of the deck 3, as shown in FIG. 1. The cavities 8 may be formed as chambers to which a person on board the vessel 1 may gain access to the chambers from inside the hull 2 and/or from the deck 3. The open end of the cavities 8 may be closed off by a removable cover 9. The cover 9 may be formed as pivotal cover connected to pivotal means arranged on the peripheral edge of the cavity 8. The cavities 8 may be configured to receive and hold various types of lifting means 10 (not shown) which are configured to raise and lower at least a part of the wind turbine 7. Other cavities 8 may be configured to store various equipment needed to install and/or service the wind turbine 7. The lifting means 10 may be a crane unit, jack-up means or other types of lifting means which may be arranged in one or more cavities 8 along the slot 6.

One or more holding means 11 may be arranged in the hull 2 of the vessel 1. The holding means 11 may be configured to secure the vessel 1 directly to an offshore foundation 12 located at an installation site. The holding means 11 may be placed in one or more recesses (not shown) in the outer surface of the hull 2, so that the holding means 11 may be moved in and out of the hull 2. The holding means 11 may comprise holding elements 11a configured to either engage corresponding elements on the foundation 12 or to press firmly against the surface of the foundation 12.

Figure 2:
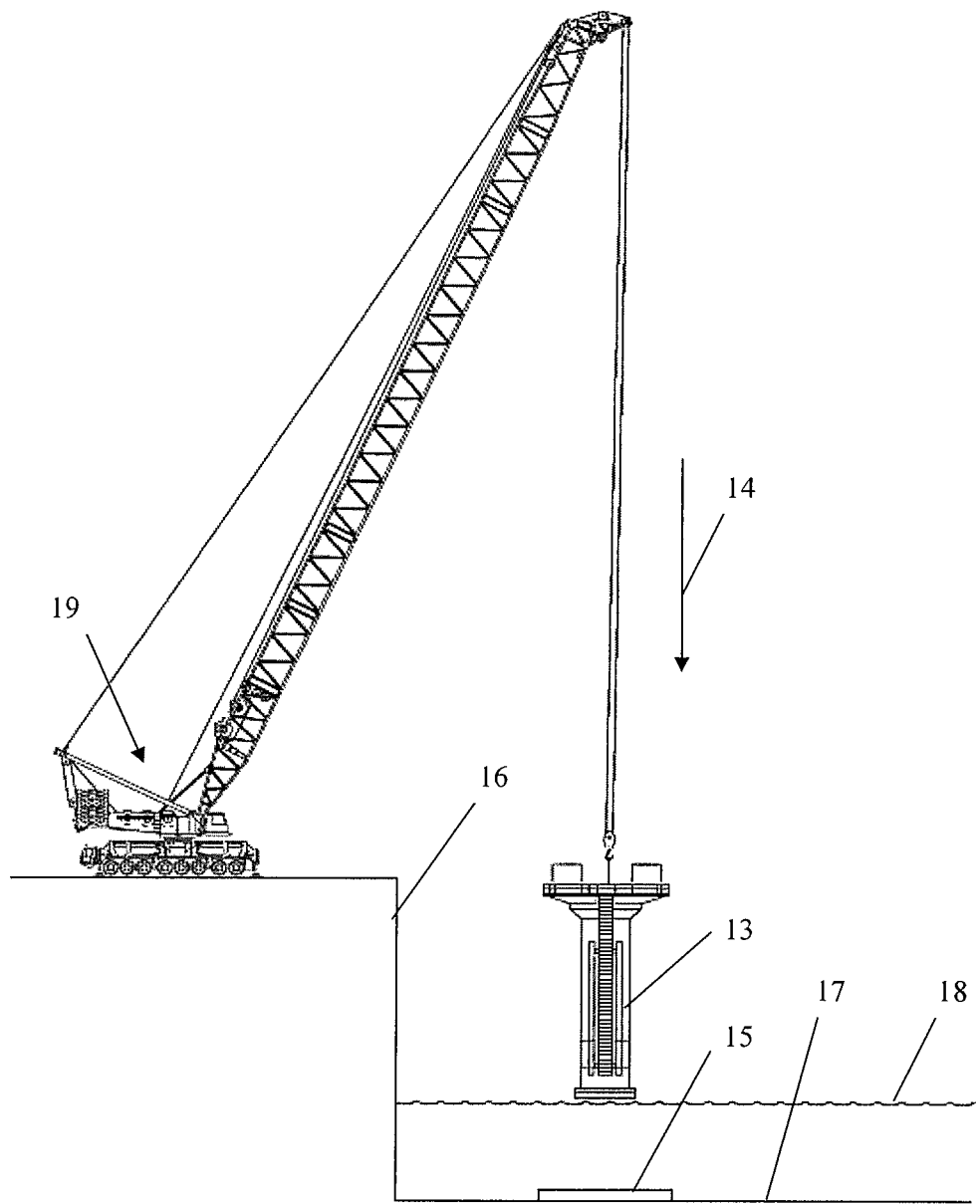
FIG. 2 shows a first step of the installation method.

FIGS. 2-8 show an exemplary installation method according to the invention using the transport vessel 1 to transport and install at least a part of the wind turbine 7. FIG. 2 shows a first step of the installation method.

At least a part of the wind turbine 7 may be preassembled at a loading site before being transported out to the installation site by the transport vessel 1. First, a first part 13 of the wind turbine 7 may be lowered into position (marked with arrow 14) on a foundation 15 in the form of an offshore foundation located near a harbour edge 16. The foundation 15 may be positioned on a seabed 17 below a water surface 18, so that the first part 13 is partly submerged under water. An onshore crane 19 may be used to position the first part 13 on the foundation 15 and to preassemble the parts of the wind turbine 7. The first part 13 may be a transition piece configured to be positioned on an offshore foundation at the installation site. Alternatively, the transition piece may be omitted and a lower tower section 20 of the wind turbine 7 may be positioned on the foundation 15 instead. The lower tower section 20 may then comprise means for engaging the lifting means 10 on the transport vessel 1. Means for allowing service crow access to the wind turbine 7 may be arranged on the transition piece 13 and/or the lower tower section 20.

Figure 3:
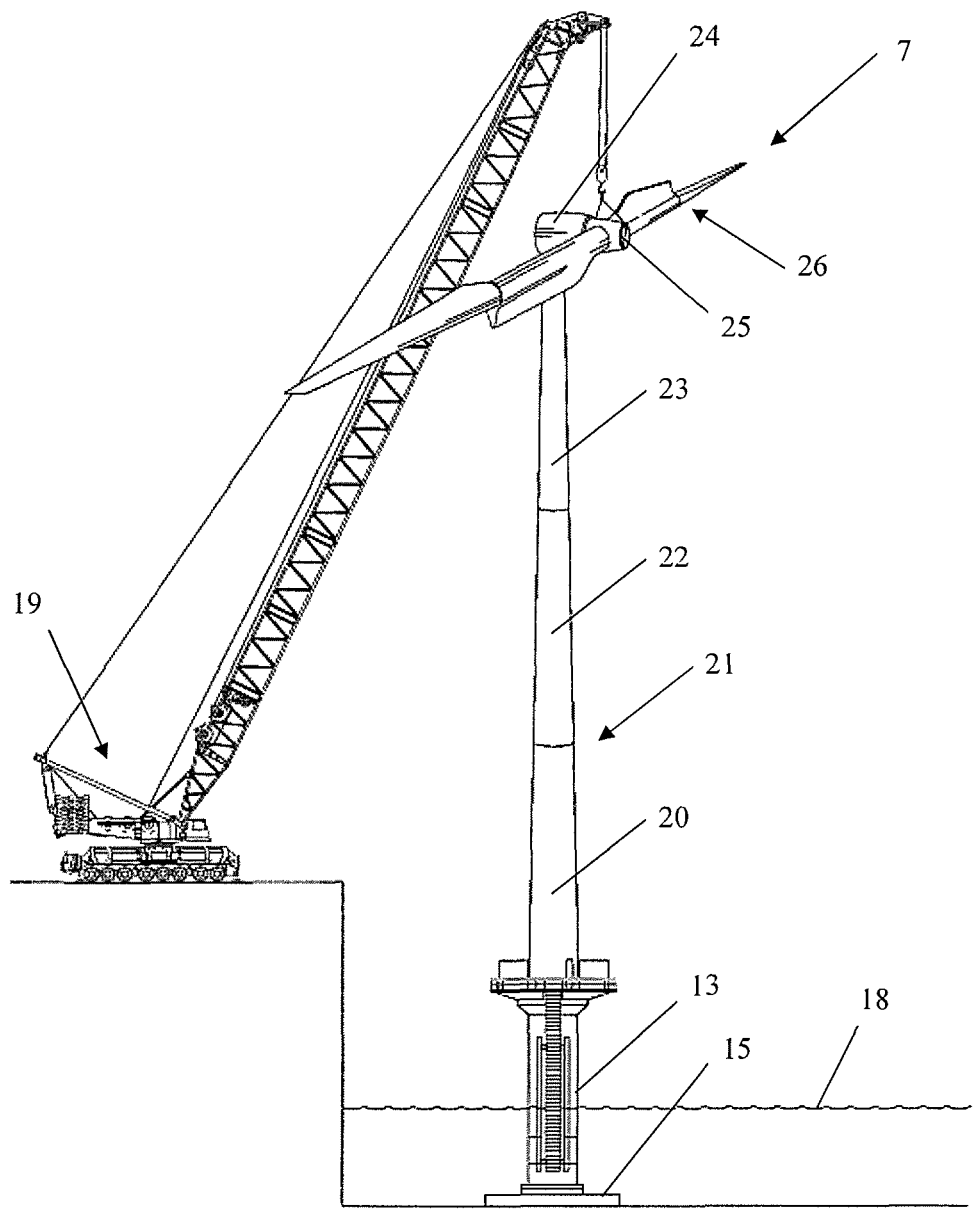
FIG. 3 shows a second step of the installation method.

FIG. 3 shows a second step of the installation method, where the entire wind turbine 7 is preassembled at the loading site. The lower tower section 20 forms part of a wind turbine tower 21 which further comprises one or more intermediate tower sections 22 and an upper tower section 23. After positioning the transition piece 13 on the foundation 15, the wind turbine tower 21 may be positioned on and connected to the transition piece 13 using the onshore crane 19. A nacelle 24 may be further connected to the upper tower section 23 before the wind turbine 7 is transported out to the installation site. Furthermore, a rotor hub 25 and one or more rotor blades 26 may be connected to the nacelle 24 at the loading site. Alternatively, the rotor hub 25 and/or the rotor blades 26 may be transported out to the installation site and connected to the nacelle 24 at a later time.

Figure 4:
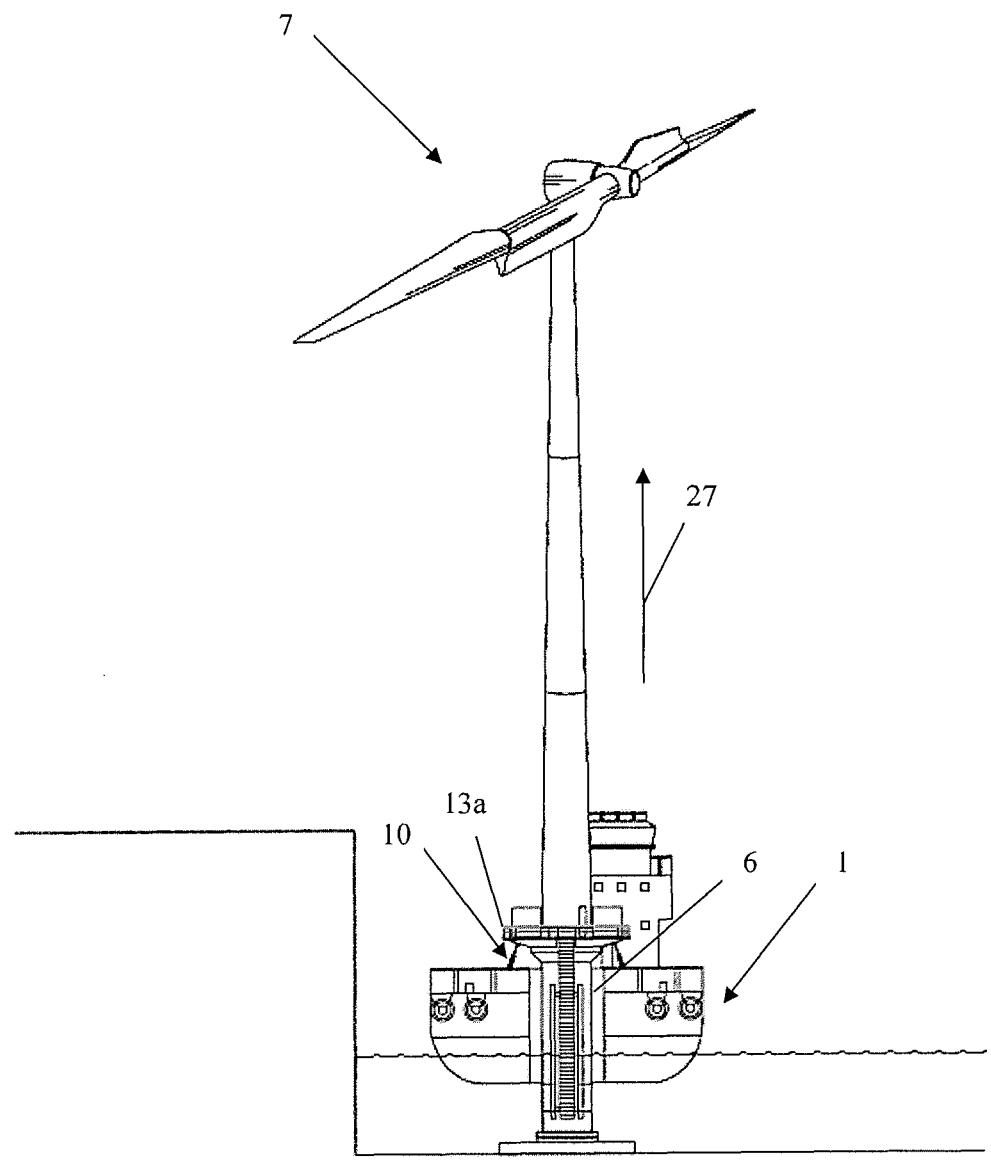
FIG. 4 shows a third step of the installation method.

FIG. 4 shows a third step of the installation method where the transport vessel 1 is positioned relative to the transition piece 13 so that the wind turbine 7 is positioned inside the slot 6 of the transport vessel 1. The transport vessel 1 is outfitted with lifting means 10 configured to raise and lower the wind turbine into position.

The wind turbine tower 21 and/or at least some of the other parts 24, 25, 26 may be omitted so that only the transition piece 13 or a preassembled section of the wind turbine 7 is transported out the installation site.

The wind turbine 7 and/or transition piece 13 is then secured to the transport vessel 1 by raising it in a perpendicular direction (marked with arrow 27) relative to the transport vessel 1 into a transport position using the lifting means 10 so that the load is transferred to the transport vessel 1. The lifting means 10 may comprise means configured to contact the outer structure of the transition piece 13 and/or engage corresponding means on the transition piece 13. The lifting means 10 may be configured to engage a platform 13a arranged on the transition piece 13 or lower tower section 20. The lifting means 10 may comprise one or more sets of jack-up means in the form of a jacking system which may be arranged in one or more cavities 8 near the slot 6. The jack-up means 10 may comprise a number of telescopic units in the form of pistons where the free end of the piston rod is configured to contact/engage the outer surface of the transition piece 13 or corresponding means thereon. A hydraulic, pneumatic, mechanical or another type of energy source (not shown) may be used to drive the pistons. Two, three or four pistons may be arranged on the transport vessel 1 relative to the wind turbine 7.

If the transport vessel 1 is outfitted with more than one set of jack-up means, the transport vessel 1 is positioned relative to a first wind turbine 7 which is then secured to the transport vessel 1 in a first position in the slot 6. The transport vessel 1 is then positioned relative to a second wind turbine 7 which is then secured to the transport vessel 1 in a second position in the slot 6.

Figure 5:
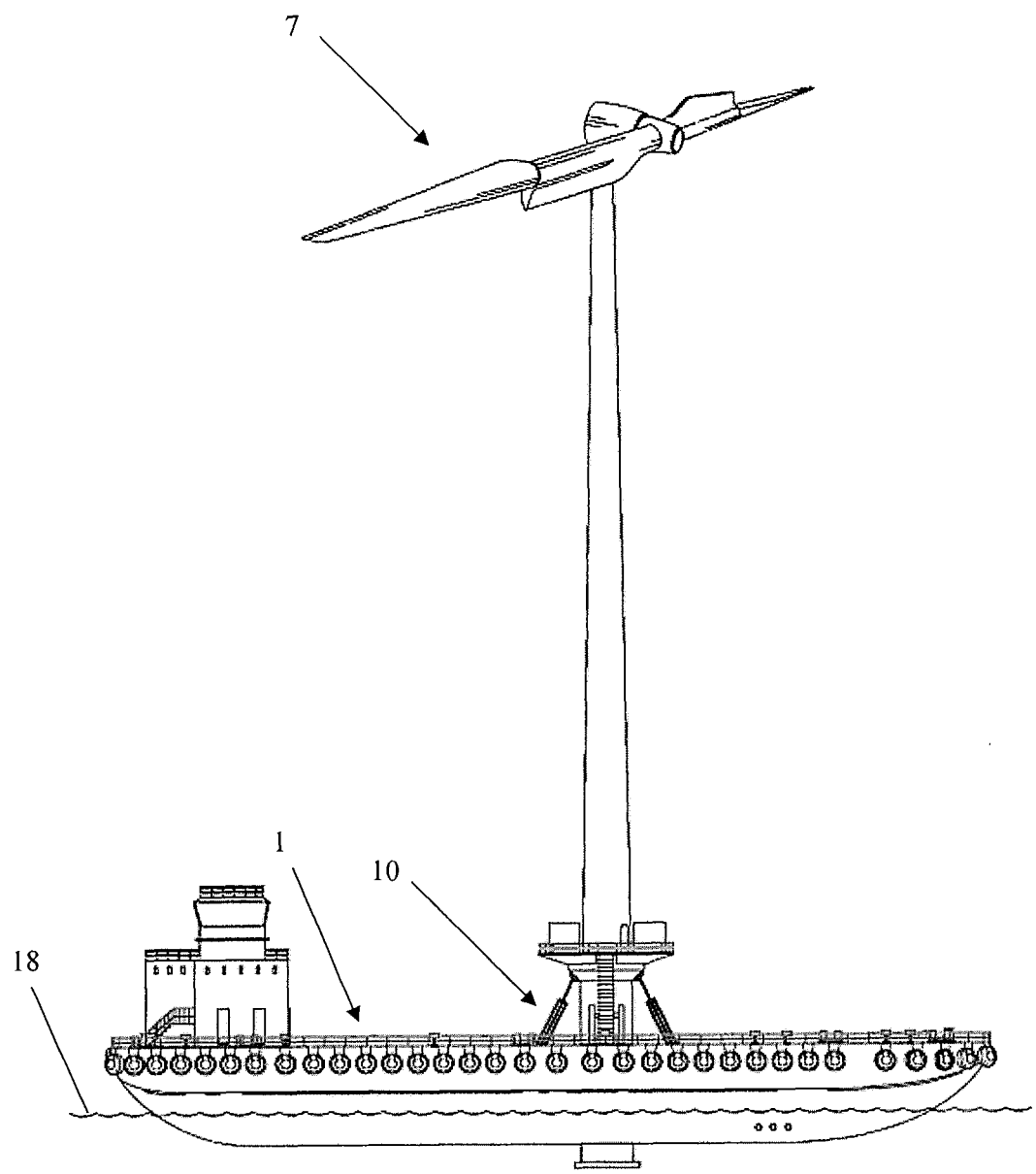
FIG. 5 shows a fourth step of the installation method.

FIG. 5 shows a fourth step of the installation method where wind turbine 7 is being transported from the loading site to the installation site. The wind turbine 7 is positioned in a transport position in which a lower portion of the transition piece 13 remains below the water surface 18, as shown in FIG. 5. The wind turbine 7 may be raised or lowered relative to the transport position, in order to provide added stability during transport.

Figure 6:
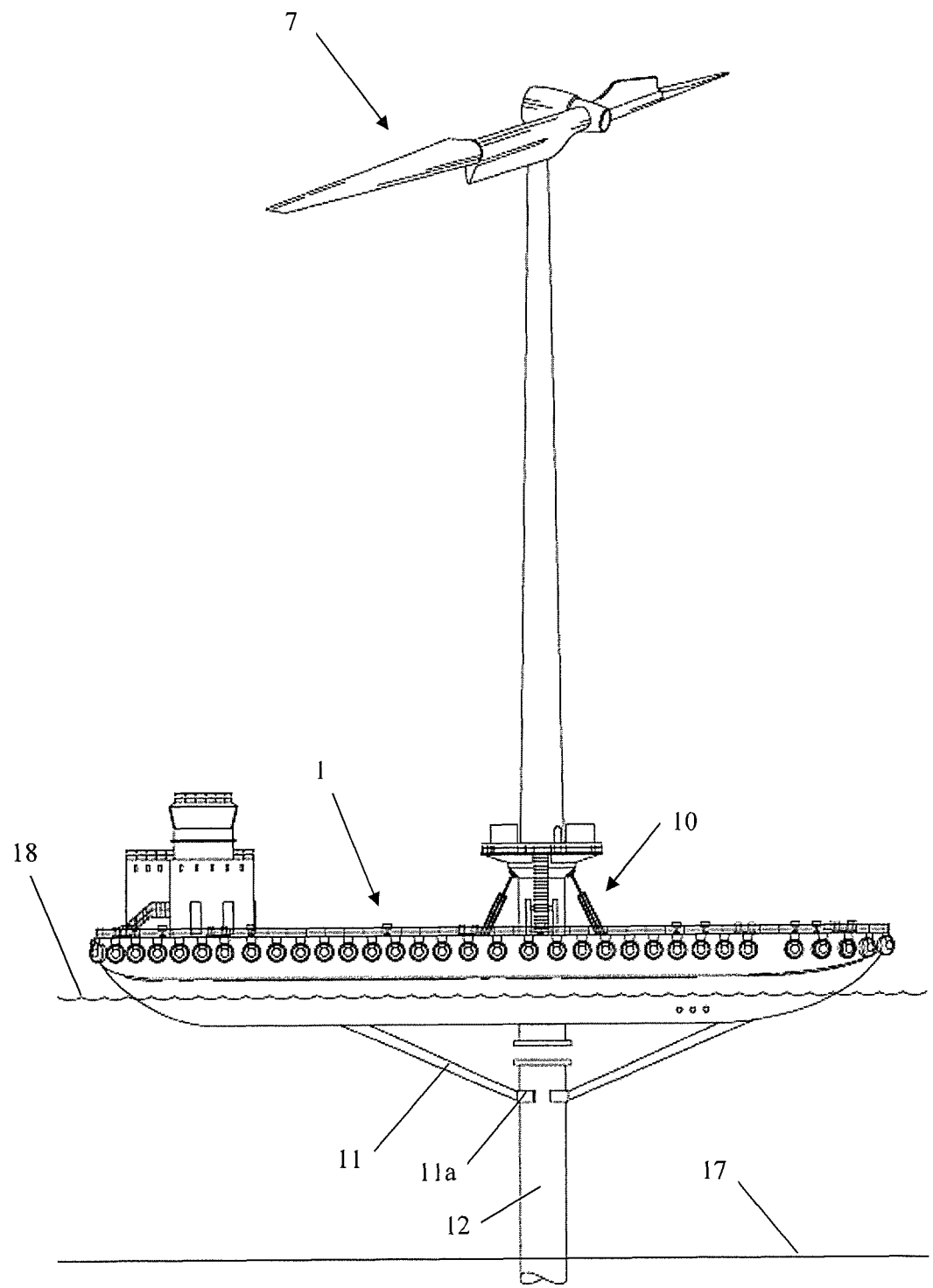
FIG. 6 shows a fifth step of the installation method.

FIG. 6 shows a fifth step of the installation method where the transport vessel 1 is positioned relative to the foundation 12 in the form of an offshore foundation using the holding means 11. The foundation 12 may be a monopole where the upper part of the foundation 12 is located below the water surface 18. Depending on the configuration of the wind turbine 7 and/or the foundation 12, other types of foundation may be used, such as a tripod, a gravity foundation or jacket foundation.

When arriving at the installation site, the holding means 11 are extended out of their initial position in the hull 2 and the holding elements 11a are brought into contact with the foundation 12 so that the transport vessel 1 is secured directly to the foundation 12 below the water surface 18. The holding means 11 are configured to correctly position one of the wind turbines 7 and/or transition pieces 13 secured to the transport vessel 1 over the foundation 12 so that the lower part of that wind turbine 7 or transition piece 13 is situated above the upper part of the foundation 12. The holding means 11 may be configured as one or more telescopic arms or one or more arms having two or more joints driven by hydraulics, air pressure or another suitable driving means. The transport vessel 1 may be moved in a plane parallel to the desk 3 in at least two perpendicular directions using the holding means 11. The wind turbine 7 and/or the transition piece 13 may be raised or lowered relative to the transport position using the lifting means 10, before the transport vessel 1 is secured to the foundation 12.

Figure 7:
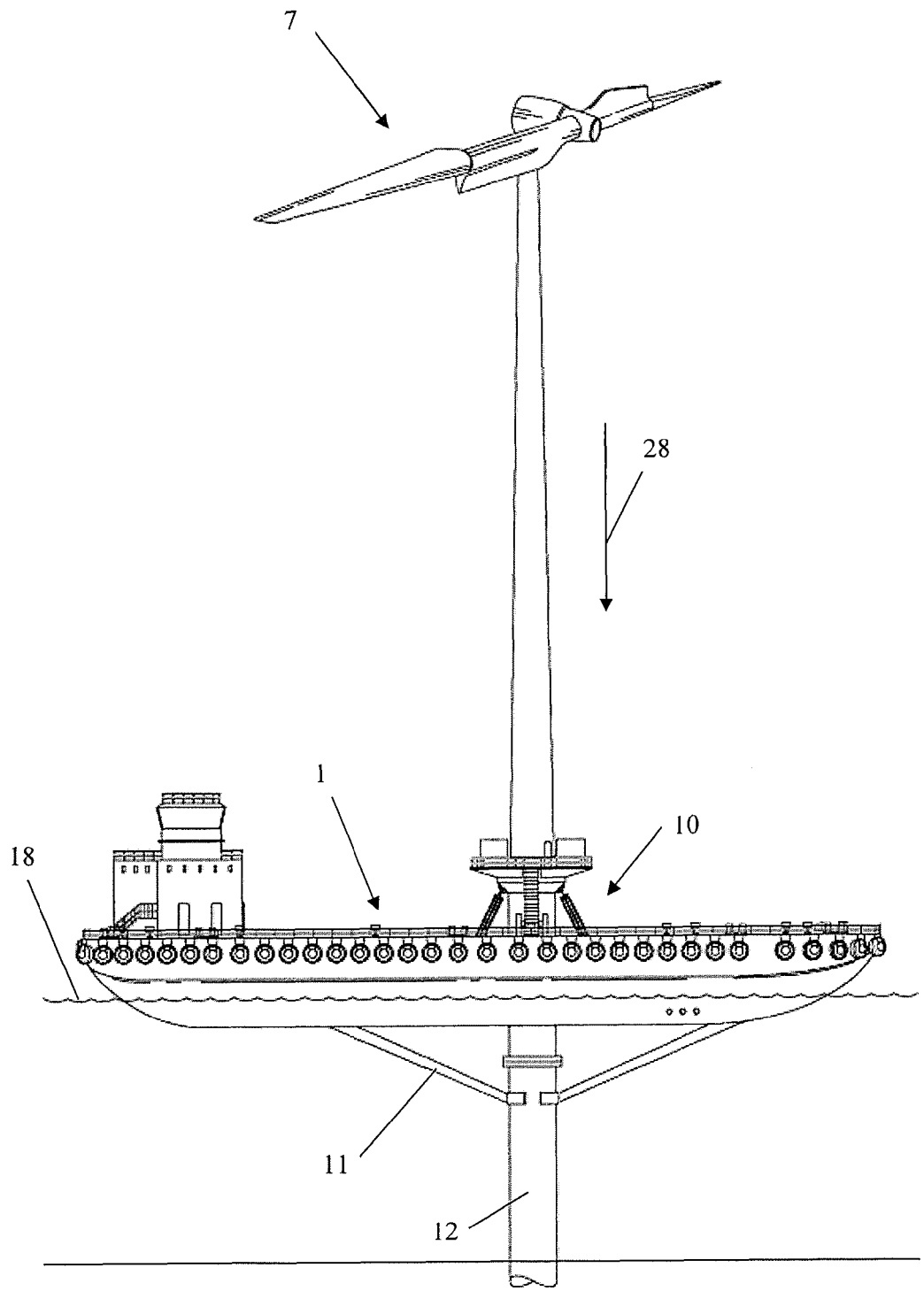
FIG. 7 shows a sixth step of the installation method.

FIG. 7 shows a sixth step of the installation method where the wind turbine 7 and/or transition piece 13 is lowered (marked with arrow 28) into contact with the foundation 12 using the lifting means 10 so that the load is transferred to the foundation 12. The wind turbine 7 and/or transition piece 13 may then be connected/secured to the foundation 12 which is carried out below the water surface 18. Depending on the configuration of the foundation 12 and/or the wind turbine 7 or the transition piece 13, the connection/installation may be carried out above the water surface 18.

Figure 8:
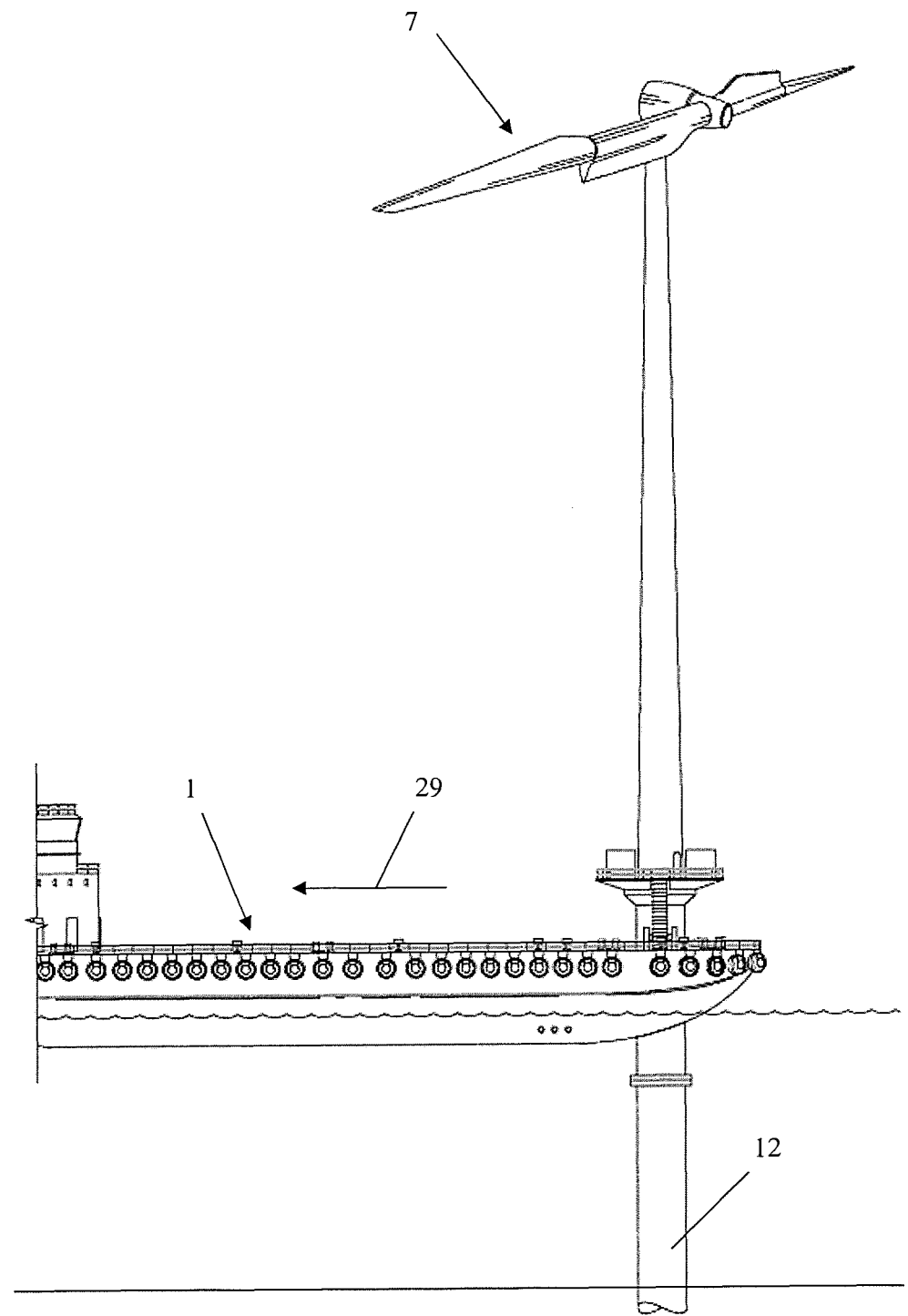
FIG. 8 shows a seventh step of the installation method.

FIG. 8 shows a seventh step of the installation method where the transport vessel 1 is moved away so that the wind turbine 7 and/or the transition piece 13 is moved out of the slot 6 in the transport vessel 1. After the wind turbine 7 and/or the transition piece 13 is connected/secured to the foundation 12, the lifting means 10 are disengaged/brought out of contact of the transition piece 13. The holding means 11 are then moved out of contact with the foundation and into their initial position in the hull 2. The transport vessel 1 may then be moved away (marked with arrow 29) from the foundation 12 using the motor unit or a towing vessel (not shown).

If the transport vessel 1 carries more than one wind turbine and/or transition piece 13, it is then moved to a new installation site where the installation process shown in FIGS. 6-8 is repeated.

What is claimed is:

1. A method of installing an offshore wind turbine comprising the steps of:
   securing at least a part of a wind turbine to a transport vessel at a loading site by bringing at least one set of jack-up means located on the transport vessel into contact with the part and raising the part in a parallel direction relative to the longitudinal direction of the wind turbine by jacking up the wind turbine relative to the vessel;
   moving the transport vessel from the loading site out to an installation site;
   securing the transport vessel to at least a part of an offshore foundation which is located at the installation site, wherein the offshore foundation is configured to receive and hold the wind turbine; and
   lowering the wind turbine onto an upper part of the offshore foundation by jacking down the wind turbine relative to the vessel using the at least one set of jack-up means,
   wherein the transport vessel is secured to the offshore foundation by moving at least one holding means out of a hull of the transport vessel and into contact with the offshore foundation.

2. A method according to claim 1, wherein the method further comprises the step of positioning at least the part of the wind turbine on a second foundation, which is located near a harbour edge, before raising the wind turbine and transporting it out to the installation site.

3. A method according to claim 1, wherein the wind turbine is positioned in a transport position in which a lower portion of the wind turbine is located below the water surface.

4. A method according to claim 1, wherein the transport vessel is positioned in one or more positions relative to the second foundation along a slot arranged in the transport vessel by moving the holding means in a plane parallel to a deck of the transport vessel.

5. A method according to claim 1, wherein two or more parts of the wind turbine are preassembled at the loading site, before the wind turbine is raised and transported out to the installation site.

6. A vessel for transporting and installing an offshore wind turbine according to claim 1 comprising:
   a hull having a deck and at least one side surface;
   a slot arranged in one of the side surfaces wherein at least one wind turbine may be positioned;
   one or more holding means for securing the vessel to an offshore foundation located at an installation site;
   wherein a number of cavities are arranged in the deck wherein one or more cavities are configured to receive and hold at least one set of jack-up means comprising a number of free ends configured to engage the wind turbine, wherein the jack-up means are configured to raise and lower at least a part of a wind turbine relative to the vessel in a direction parallel to the longitudinal direction of the wind turbine, and
   wherein the holding means are arranged in the hull, wherein the holding means are configured to be moved out of the hull and into contact with the offshore foundation below the water surface.

7. A vessel according to claim 6, wherein at least one cavity is configured to receive and hold a crane unit, wherein the crane unit is configured to engage at least one part of the wind turbine or at least one element arranged in or on one of the parts of the wind turbine.

8. A vessel according to claim 6, wherein the holding means are configured to position the vessel in at least one position relative to the offshore foundation along the slot.

* * * * *